US012119550B2

(12) United States Patent
Dellock et al.

(10) Patent No.: US 12,119,550 B2
(45) Date of Patent: Oct. 15, 2024

(54) COMPOSITE ANTENNA MOUNT

(71) Applicant: Ford Global Technologies, LLC, Dearborn, MI (US)

(72) Inventors: Paul Kenneth Dellock, Northville, MI (US); Stuart C. Salter, White Lake, MI (US); Steven C. Pintar, Ann Arbor, MI (US); Tye Arthur Winkel, Canton, MI (US); Thomas Joseph Hermann, Troy, MI (US); Katherine Howard-Cone, Canton, MI (US); Jeffrey Scott Mayville, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 231 days.

(21) Appl. No.: 17/863,831

(22) Filed: Jul. 13, 2022

(65) Prior Publication Data

US 2024/0022002 A1 Jan. 18, 2024

(51) Int. Cl.

| | |
|---|---|
| ***H01Q 13/24*** | (2006.01) |
| ***H01Q 1/32*** | (2006.01) |
| ***H01Q 1/52*** | (2006.01) |

(52) U.S. Cl.
CPC .......... *H01Q 13/24* (2013.01); *H01Q 1/3275* (2013.01); *H01Q 1/526* (2013.01)

(58) Field of Classification Search
CPC ...... H01Q 13/24; H01Q 1/3275; H01Q 1/526; H01Q 1/12
See application file for complete search history.

(56) References Cited

U.S. PATENT DOCUMENTS

| | | | | |
|---|---|---|---|---|
| 7,522,108 | B2 | 4/2009 | Heng et al. | |
| 9,241,433 | B2 | 1/2016 | Shah et al. | |
| 2010/0277379 | A1* | 11/2010 | Lindackers .......... | H01Q 1/3275 343/878 |
| 2014/0063595 | A1 | 3/2014 | Jang et al. | |
| 2020/0253096 | A1* | 8/2020 | Mcbain .................. | H05K 9/009 |

FOREIGN PATENT DOCUMENTS

| | | |
|---|---|---|
| WO | 2008012196 | 1/2008 |

* cited by examiner

*Primary Examiner* — Daniel D Chang
(74) *Attorney, Agent, or Firm* — Burris Law, PLLC

(57) ABSTRACT

A composite antenna mount includes a polymer matrix, a plurality of particles dispersed through the polymer matrix, at least some of the particles including a ferromagnetic coating, and a plurality of electrically conductive filaments electrically connecting the ferromagnetic coatings of the particles. The ferromagnetic coating each coated particle is configured to absorb electromagnetic radiation in a specified frequency range.

20 Claims, 5 Drawing Sheets

COMPOSITE ANTENNA MOUNT

FIELD

The present disclosure relates to composite materials for use with communications systems.

BACKGROUND

The statements in this section merely provide background information related to the present disclosure and may not constitute prior art.

Vehicles use communications systems to communicate with other vehicles, mobile devices, and external servers. The communications systems include components such as antennas, receivers, and transmitters that use electromagnetic waves at specified frequency ranges dedicated to communications. Stray signals interfere with communications by the communications systems, and material properties of vehicle components to which the communications systems are mounted or attached affect an amount of interference. In particular, when a vehicle roof is made entirely of glass, attaching the communications system to the roof may be difficult, and other vehicle components may contribute to communications interference.

The present disclosure addresses these challenges of integrating communications systems with vehicle structures.

SUMMARY

This section provides a general summary of the disclosure and is not a comprehensive disclosure of its full scope or all of its features.

In one form, a composite antenna mount includes a polymer matrix, a plurality of particles dispersed through the polymer matrix, at least some of the particles including a ferromagnetic coating, and a plurality of electrically conductive filaments electrically connecting the ferromagnetic coatings of the particles. The ferromagnetic coating of each coated particle is configured to absorb electromagnetic radiation in a specified frequency range.

In variations of the composite antenna mount, which may be implemented individually or in combination: the particles are glass spheres; the electrically conductive filaments are carbon nanotubes; the particles are hollow; the specified frequency range includes frequencies used in 5G telecommunication networks; the ferromagnetic coatings are configured to absorb electromagnetic radiation in a plurality of specified frequency ranges used in 5G telecommunication networks; the electrically conductive filaments are electrically connected to an electrically conductive vehicle component; the electrically conductive vehicle component grounds the electromagnetic radiation absorbed by the ferromagnetic coatings; the ferromagnetic coating is corrosion resistant; the ferromagnetic coating includes nickel ferrite; the electrically conductive filaments are at least 1% by weight of the composite antenna mount; the ferromagnetic coatings are configured to absorb electromagnetic radiation in the specified frequency range.

In another form, a vehicle component includes an electrically conductive vehicle structure, a composite antenna mount supported by the vehicle structure, and an antenna module supported by the composite antenna mount. The composite antenna mount includes a polymer matrix, a plurality of particles dispersed through the polymer matrix, at least some of the particles including a ferromagnetic coating, and a plurality of electrically conductive filaments electrically connecting the ferromagnetic coatings of the particles. The ferromagnetic coating of each coated particle is configured to absorb electromagnetic radiation in a specified frequency range to the electrically conductive vehicle structure.

In variations of the vehicle component, which may be implemented individually or in combination: the electrically conductive vehicle structure is a liftgate; an electrically conductive fastener connects the composite antenna mount to the electrically conductive vehicle structure; the component further includes an outer layer and an inner layer, the outer layer disposed above the composite antenna mount and the inner layer disposed on the electrically conductive vehicle structure; the outer layer and the inner layer enclose the composite antenna mount therebetween; the outer layer and the inner layer comprise a vehicle spoiler; the composite antenna mount is supported by the inner layer; the composite antenna mount is formed with the inner layer as a unitary structure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
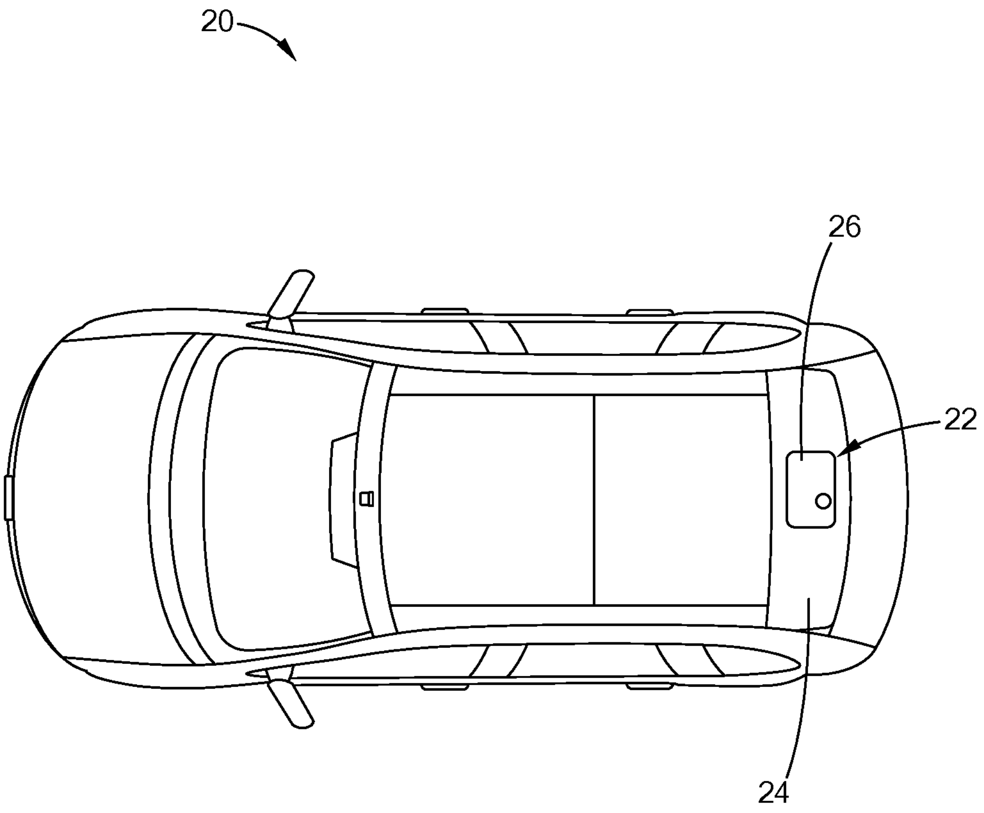
FIG. 1 is a plan view of a vehicle with an antenna module according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a vehicle 20 includes a communications system 22 for transmitting and receiving data from an external source. External sources include other vehicles, mobile devices, satellites, and external servers such as fleetwide management systems and cloud servers, among others. Data is transmitted and received via these communications, such as location data from a satellite or component operation data from the vehicle. The communications system 22 communicates with electromagnetic waves in specific frequency ranges. In one form, the communications system communicates over frequency ranges used for cellular networks, e.g., 5G. These ranges include 600-800 megahertz (MHz), 2.5-3.7 gigahertz (GHz) and 25-39 GHz.

The communications system 22, such as an antenna by way of example, is disposed on a vehicle component 24, such as a roof by way of example. To reduce interference from noise near specified frequency ranges (e.g., 5G), the communications system 22 is mounted to an electrically conductive vehicle component 24, such as a vehicle roof that is conventionally made of a metal, such as aluminum by way of example. In the form shown in FIG. 1, the roof of the vehicle 20 is made of electrically insulating glass, rather than metal, and the communications system 22 is thus mounted to a different component 24 other than the roof. In FIG. 1 and as further described below, the communication system 22 in one form is mounted to a vehicle spoiler that absorbs stray frequency signals that could interfere with communications to and from the communication system 22. Specifically, an antenna mount 26 formed of a composite material according to this disclosure reduces interference of signals that the communications system 22 transmits and receives, thus improving operation of the communications system 22.

Figure 2:
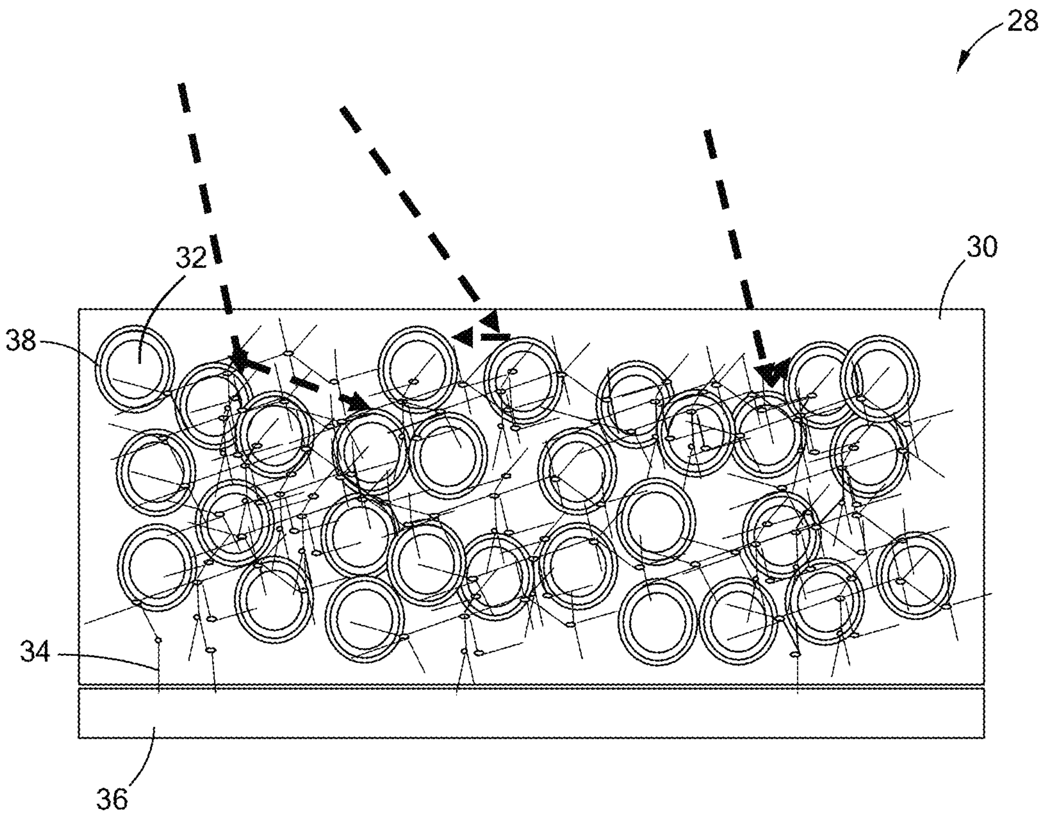
FIG. 2 is a schematic view of a composite material for forming the antenna module according to the present disclosure.

With reference to FIG. 2, a composite material 28 for the antenna mount 26 includes a polymer matrix 30, a plurality of particles 32 dispersed through the polymer matrix 30, and a plurality of electrically conductive filaments 34 that electrically connect the particles 32 to an electrical ground 36. The antenna mount 26 formed of the composite material 28 functions to reduce interference from stray frequency signals by absorbing electromagnetic radiation in predetermined frequency ranges (e.g., 5G, and above), improving communication by an antenna of the communications system 22 of the vehicle 20.

The composite material 28 includes the polymer matrix 30. The polymer matrix 30 provides the overall structure of the composite material. The polymer matrix 30 supports filler objects that are added to provide specific characteristics to the composite material 28, such as enhanced strength or frequency absorption. The polymer matrix 30 is a liquid that cures or hardens to a moldable solid form. The polymer matrix is a suitable material for specific characteristics of the component to be constructed. In one form, the polymer matrix 30 is a polypropylene resin selected for impact energy absorption properties. In another form, the polymer matrix 30 is a polycarbonate or nylon suitable for specific high temperature constraints. In another form, the polymer matrix 30 is a polyethylene suitable for specific ductility constraints for manufacturing. Structural filler materials (not shown) may be added to the polymer matrix 30 to achieve specific strength and/or deformation characteristics, such as glass bubbles, carbon fiber, hemp, flax, talc, or wollastonite, among others.

The composite material 28 includes a plurality of particles 32 dispersed through the polymer matrix 30. For clarity of the drawing, one particle 32 includes reference numbers, and it is understood to be within the scope of the disclosure that the other spherical objects shown in FIG. 2 are particles 32. The particles 32 absorb electromagnetic radiation in specific frequency ranges, such as 5G frequency ranges. In one form, the particles 32 are hollow glass spheres. The hollow glass spheres reflect the electromagnetic radiation away from the spheres and toward other hollow glass spheres, as shown with the arrows in FIG. 1. Electromagnetic radiation not absorbed by one of the spheres is reflected toward another of the spheres, which absorbs some of the reflected electromagnetic radiation and reflects the rest of the electromagnetic radiation toward another of the spheres. The spherical shape of the particles 32 reduces electromagnetic radiation reflection back along an angle of incidence at which the radiation reached the particles 32, reducing interference of the radiation. In another form, the particles 32 are solid glass spheres. In yet other forms not shown, the particles 32 are cubes, tetrahedrons, dodecahedrons, or other polygonal shape, amorphous solids, among others. The particles 32 are a suitable size to absorb the electromagnetic radiation, and in the form of FIG. 2, the spheres have respective diameters of about 10-50 microns. In one form, the particles 32 have substantially a same size as each other. The particles 32 are dispersed through the liquid polymer before the polymer cures into the polymer matrix 30 in a suitable distribution, e.g., evenly or unevenly.

Each particle 32 has a ferromagnetic coating 38. The ferromagnetic coating 38 absorbs electromagnetic radiation, reducing interference from radiation in 5G frequency ranges. In one form, the ferromagnetic coating 38 of a first sphere absorbs a portion of the electromagnetic radiation and reflects the remaining electromagnetic radiation to a second sphere. The respective ferromagnetic coating 38 of the second sphere absorbs some of the remaining electromagnetic radiation and reflects the unabsorbed electromagnetic radiation to a third sphere. The spherical ferromagnetic coatings 38 thus absorb the electromagnetic radiation in specified frequency ranges, such as 5G telecommunication network ranges. In one form, the ferromagnetic coating 38 is applied to each particle 32 by immersing the particles 32 in a metal salt solution. Using coated particles 32 reduces the amount of ferromagnetic material used in the composite material 28 compared to using ferromagnetic powder alone. The composite material 28 includes a suitable amount of coated particles 32 to absorb the electromagnetic radiation. In one form, the composite material 28 includes about 8 wt. % coated particles 32.

In one form, the ferromagnetic coating 38 is nickel ferrite. Alternatively, in other forms, the ferromagnetic coating is zinc nickel or magnesium ferrite. The ferromagnetic coating 38 provides a specified resistivity (i.e., an electrical resistance of a given length of a material, measured in ohm-meters) through the composite material 28. In one form, the particles 32 with the ferromagnetic coatings 38 have a resistivity of about 100 ohm-cm. The resistivity of the ferromagnetic coatings 38 is selected to absorb the specific frequency ranges. In one form, the ferromagnetic coating 38 is resistant to corrosion by the polymer matrix 30 to improve dissipation throughout the life of the antenna mount 26 formed of the composite material 28.

The composite material 28 further includes a plurality of electrically conductive filaments 34 as shown. For clarity of the drawing one filament 34 is shown to include reference numbers, and it is it is understood to be within the scope of the disclosure that the other straight objects shown in FIG. 2 are filaments 34. The electrically conductive filaments 34 electrically connect the ferromagnetic coatings 38 of the particles 32 to each other and to the ground 36, such as an electrically conductive vehicle component 24. The network of electrically conductive filaments 34 form an electrical circuit between the ferromagnetic coatings 38 of the particles 32, dissipating absorbed electromagnetic radiation to the ground 36. The electrically conductive filaments 34 are typically smaller and lighter than the particles 32, increasing the conductivity of the composite material 28 to absorb electromagnetic radiation without increasing weight or affecting ductility appreciably of the composite material 28 compared to using particles 32 only. The electrically conductive filaments 34 are added to the liquid polymer and dispersed through the liquid polymer prior to curing the polymer matrix 30. In one form, the electrically conductive filaments 34 are individual carbon nanotubes. In another form, the electrically conductive filaments 34 are carbon nanostructures formed of stacked carbon nanotubes that form a network of electrically connected nanotubes. In the form of FIG. 2, the electrically conductive filaments 34 contact each other at contact points, or nodes, represented as circles. A suitable number of electrically conductive filaments 34 to absorb the 5G signals is dispersed through the polymer matrix 30, e.g., at least 1 wt. %.

Figure 3:
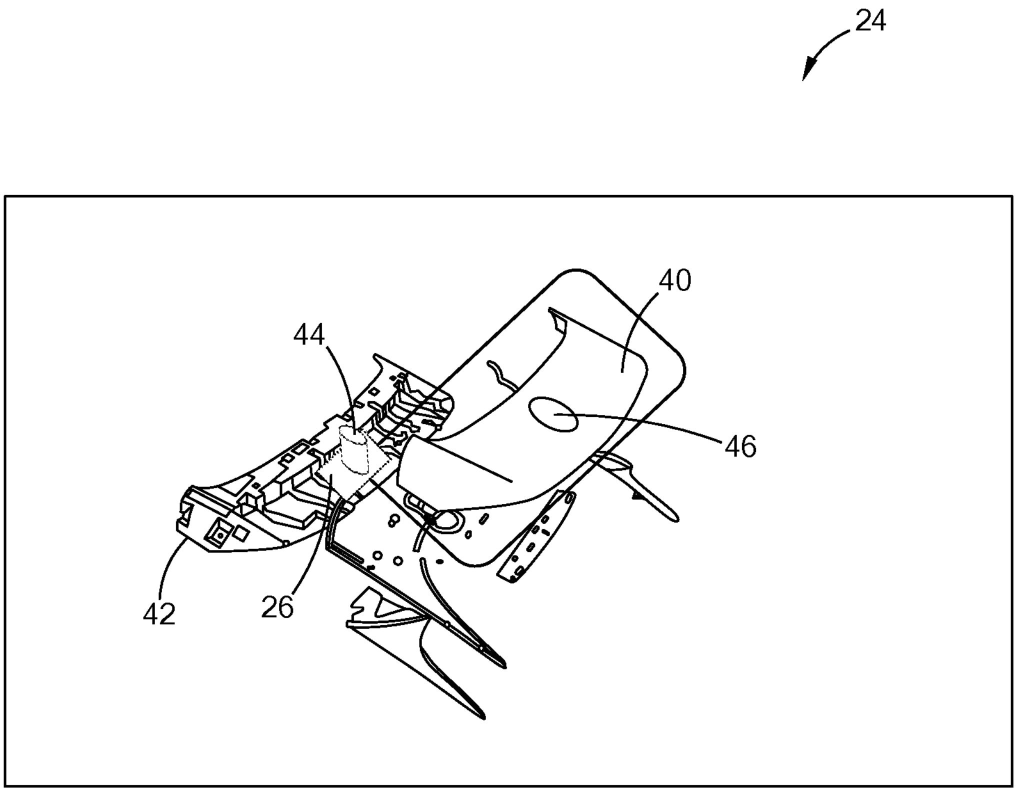
FIG. 3 is an exploded view of a vehicle component with the antenna module according to the present disclosure.

With reference to FIG. 3, a vehicle component 24 for a vehicle 20 is a vehicle spoiler including an outer layer 40, an inner layer 42, a composite antenna mount 26, and an antenna module 44 supported by the composite antenna mount 26. The composite antenna mount 26 and the antenna module 44 are parts of a communications system 22 described above. The vehicle spoiler includes the antenna module 44 when the roof is a glass roof that has no electrically conductive parts to support the antenna module 44 and to absorb signal interference. The vehicle spoiler is connected to an electrically conductive vehicle structure (acting as an electrical ground 36), such as a liftgate, and the composite antenna mount 26 absorbs frequencies in the 5G frequency ranges through the electrically conductive vehicle structure. The antenna module 44 thus communicates according to intended 5G protocols with reduced interference from stray signals absorbed by the composite antenna mount 26 and grounded by the vehicle structure.

The antenna module 44 is supported by the composite antenna mount 26 and extends out from the outer layer 40 to communicate according to 5G communication protocols. The outer layer 40 and the inner layer 42 connect to enclose the composite antenna mount 26, and the outer layer 40 includes a hole 46 through which the antenna module 44 extends. The antenna module 44 sends and receives signals through the portion of the antenna module 44 extending through the hole 46 above the outer layer 40. The antenna module 44 is mostly hidden from external view other than the portion extending through the hole 46.

The composite antenna mount 26 is formed of the composite material 28 including the particles 32 with the ferromagnetic coatings 38 and the electrically conductive filaments 34 connecting to the ground 36. Stray signals in 5G frequency ranges that could interfere with the antenna module 44 are absorbed by the composite antenna mount 26. The composite material 28 of the composite antenna mount 26 absorbs the stray signals through the ferromagnetically coated particles 32 and electrically conductive filaments 34 to the electrically conductive vehicle structure. The inner layer 42 electrically connects the composite antenna mount 26 to the electrically conductive vehicle structure, dissipating the stray signals from the particles 32 through the inner layer 42 and to the vehicle structure.

Figure 4:
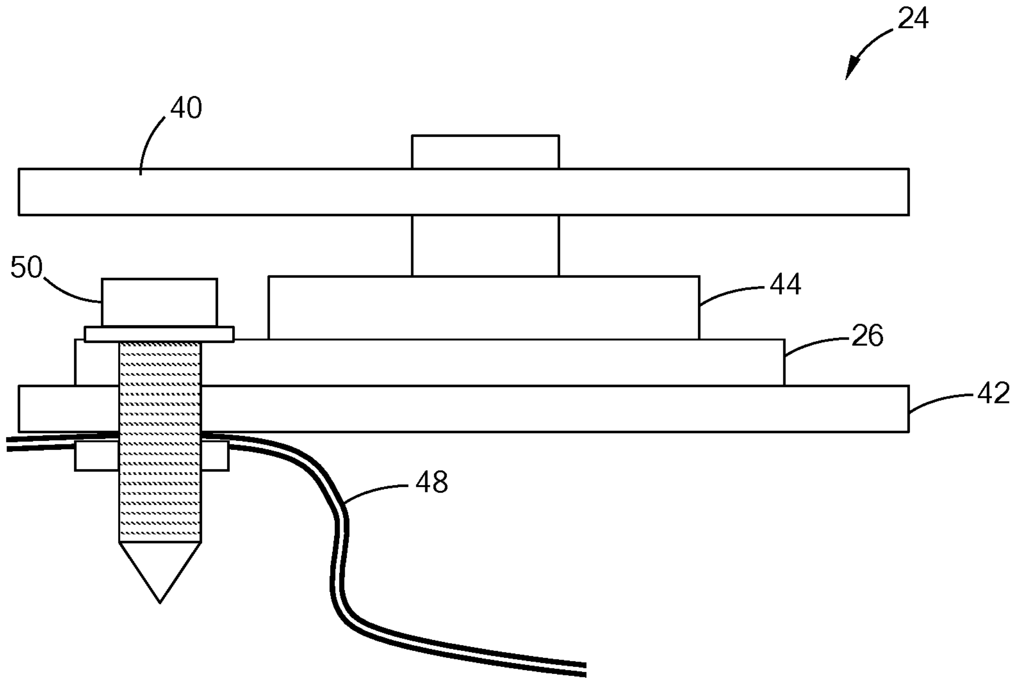
FIG. 4 is a side cross-sectional view of the vehicle component with the antenna module according to the present disclosure.
Figure 5:
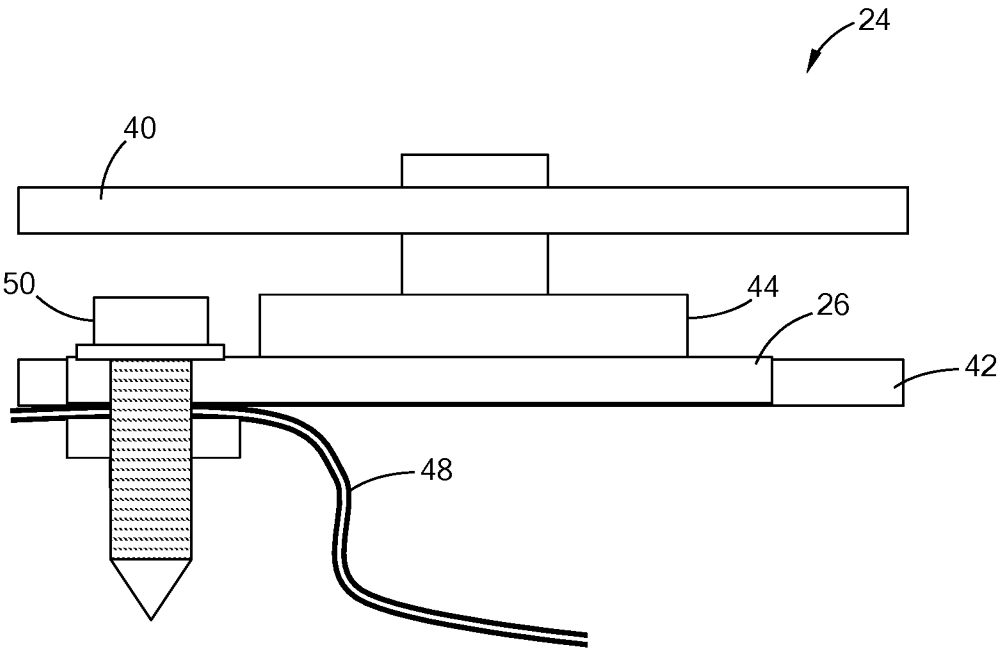
FIG. 5 is a side cross-sectional view of another form of the vehicle component with the antenna module according to the present disclosure.

With reference to FIGS. 4-5, the vehicle component 24 includes the antenna module 44, the composite antenna mount 26, and an electrically conductive vehicle structure 48, shown here as a sheet of metal. The inner layer 42 of the vehicle component 24 supports the composite antenna mount 26, and the composite antenna mount 26 supports the antenna module 44. The inner layer 42 is disposed on the electrically conductive vehicle structure 48, such as the liftgate. The outer layer 40 is disposed above the antenna mount 44 such that the composite antenna mount 26 is enclosed between the inner and outer layers 40, 42.

An electrically conductive fastener 50 connects the composite antenna mount 26 to the electrically conductive vehicle structure 48 through the inner layer 42. The fastener 50 is in one form a metal screw, and any suitable electrically conductive fastener 50 is within the scope of this disclosure. The composite antenna mount 26 absorbs stray 5G signals and conducts the absorbed signals to the electrically conductive fastener 50, which conducts the absorbed signals to the vehicle structure 48. The vehicle structure 48 grounds the signals, dissipating signals that could interfere with the antenna module 44. Thus, the composite antenna mount 26 absorbs the signals to the vehicle structure 48 by the fastener 50.

In the form of FIG. 4, the composite antenna mount 26 is formed separately from the inner layer 42 of the vehicle component 24, such as in a two-shot injection molding process. In such a process, the inner layer 42 is injection molded, and then the composite antenna mount 26 is placed on top of the inner layer 42. In another form shown in FIG. 5, the composite antenna mount 26 and the inner layer 42 are formed together as a unitary structure, such as a one-shot injection molding process. In such a process, material for the inner layer 42 is injected to a mold, and then the polymer matrix 30 is deposited into the mold. The particles 32 and filaments 34 are then deposited into the polymer matrix 30. The inner layer 42 and the polymer matrix 30 then harden together, forming the unitary structure including both the inner layer 42 of the vehicle component 24 and the composite antenna mount 26.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A composite antenna mount, the composite antenna mount comprising:

a polymer matrix;

a plurality of particles dispersed through the polymer matrix, at least some of the plurality of particles including a ferromagnetic coating; and a plurality of electrically conductive filaments electrically connecting the ferromagnetic coatings of the at least some of the plurality of particles to form an electrical circuit between the ferromagnetic coatings, wherein the ferromagnetic coating of each coated particle is configured to absorb electromagnetic radiation in a specified frequency range.

2. The composite antenna mount of claim 1, wherein the plurality of particles are glass spheres.

3. The composite antenna mount of claim 1, wherein the plurality of electrically conductive filaments are carbon nanotubes.

4. The composite antenna mount of claim 1, wherein the plurality of particles are hollow.

5. The composite antenna mount of claim 1, wherein the specified frequency range includes frequencies used in 5G telecommunication networks.

6. The composite antenna mount of claim 5, wherein the ferromagnetic coatings are configured to absorb electromagnetic radiation in a plurality of specified frequency ranges used in 5G telecommunication networks.

7. The composite antenna mount of claim 1, wherein the plurality of electrically conductive filaments are electrically connected to an electrically conductive vehicle component.

8. The composite antenna mount of claim 7, wherein the electrically conductive vehicle component grounds the electromagnetic radiation absorbed by the ferromagnetic coatings.

9. The composite antenna mount of claim 1, wherein the ferromagnetic coating is corrosion resistant.

10. The composite antenna mount of claim 1, wherein the ferromagnetic coating comprises nickel ferrite.

11. The composite antenna mount of claim 1, wherein the plurality of electrically conductive filaments are at least 1% by weight of the composite antenna mount.

12. The composite antenna mount of claim 1, wherein the ferromagnetic coatings are configured to absorb electromagnetic radiation in the specified frequency range.

13. A vehicle component comprising:

an electrically conductive vehicle structure;

a composite antenna mount supported by the electrically conductive vehicle structure; and an antenna module supported by the composite antenna mount, wherein the composite antenna mount comprises:

a polymer matrix;

a plurality of particles dispersed through the polymer matrix, at least some of the plurality of particles including a ferromagnetic coating; and a plurality of electrically conductive filaments electrically connecting the ferromagnetic coatings of the at least some of the plurality of particles to form an electrical circuit between the ferromagnetic coatings, wherein the ferromagnetic coating of each coated particle is configured to absorb electromagnetic radiation in a specified frequency range to the electrically conductive vehicle structure.

14. The vehicle component of claim 13, wherein the electrically conductive vehicle structure is a liftgate.

15. The vehicle component of claim 13, further comprising an electrically conductive fastener connecting the composite antenna mount to the electrically conductive vehicle structure.

16. The vehicle component of claim 13, further comprising an outer layer and an inner layer, the outer layer disposed above the composite antenna mount and the inner layer disposed on the electrically conductive vehicle structure.

17. The vehicle component of claim 16, wherein the outer layer and the inner layer enclose the composite antenna mount therebetween.

18. The vehicle component of claim 17, wherein the outer layer and the inner layer comprise a vehicle spoiler.

19. The vehicle component of claim 16, wherein the composite antenna mount is supported by the inner layer.

20. The vehicle component of claim 16, wherein the composite antenna mount is formed with the inner layer as a unitary structure.

* * * * *